(12) United States Patent
Mahlab

(10) Patent No.: US 9,025,915 B2
(45) Date of Patent: May 5, 2015

(54) METHOD AND MODULE FOR SWITCHING OPTICAL SIGNALS HAVING DIFFERENT MODES OF PROPAGATION

(71) Applicant: ECI Telecom Ltd., Petach Tikva (IL)

(72) Inventor: Uri Mahlab, Or Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 407 days.

(21) Appl. No.: 13/628,721

(22) Filed: Sep. 27, 2012

(65) Prior Publication Data

US 2013/0077916 A1 Mar. 28, 2013

(30) Foreign Application Priority Data

Sep. 27, 2011 (IL) .......................................... 215432

(51) Int. Cl.
*G02B 6/35* (2006.01)
*G02B 6/14* (2006.01)
*H04Q 11/00* (2006.01)

(52) U.S. Cl.
CPC .............. *G02B 6/356* (2013.01); *G02B 6/3508* (2013.01); *H04Q 11/0005* (2013.01); *H04Q 2011/0016* (2013.01); *H04Q 2011/0024* (2013.01); *H04Q 2011/0039* (2013.01)

(58) Field of Classification Search
USPC .......................................................... 385/12
See application file for complete search history.

(56) References Cited

U.S. PATENT DOCUMENTS

| 8,724,934 B2* | 5/2014 | Bagheri et al. ..................... 385/3 |
| 2012/0224861 A1* | 9/2012 | Winzer et al. .................. 398/143 |
| 2014/0161390 A1* | 6/2014 | Winzer et al. ................... 385/28 |

* cited by examiner

*Primary Examiner* — Michelle R Connelly
(74) *Attorney, Agent, or Firm* — Browdy and Neimark, PLLC

(57) ABSTRACT

A method and module for affecting controlled switching of optical signals having different modes of propagation, wherein the module being provided with at least two multimode ports MMPs and a plurality of single-mode ports SMPs, the method comprises: inputting at least one multimode optical signal to an MMP of said MMPs; inputting the single mode optical signals to the SMPs; performing mode processing of one or more of the single mode and multi mode optical signals within the switching module, controllably and selectively switching different optical signals inputted to different ports of the module, preferably based on received feedback related to quality information, thereby allowing switching between single mode ports, between multi-mode ports, and between single mode and multi mode ports.

18 Claims, 3 Drawing Sheets

METHOD AND MODULE FOR SWITCHING OPTICAL SIGNALS HAVING DIFFERENT MODES OF PROPAGATION

FIELD OF THE INVENTION

The present invention relates to switching of optical signals in an optical network, and in particular—to a method and a module for switching optical signals being conveyed at various propagation modes.

BACKGROUND OF THE INVENTION

It is quite often that a certain wavelength (optical channel) is required for transmitting different optical signals within a common optical network. This situation causes a physical conflict which needs to be resolved.

The following are some conventional solutions for the situation:
  a) Using the wavelength conversion approach (optically or electrically), i.e., changing the channel/wavelength for one of the conflicting optical signals so as to allow passing simultaneously both conflicting signals via a single network node.
  b) Rerouting of one of the conflicting optical signals to an alternative route in the network, where it will use the same unchanged wavelength but no conflict with other signals of the same wavelength will occur.

Still, a problem occurs when the optical channels budget of the network is limited, and/or when two or even more optical signals using the same wavelength/channel are forced to pass via one specific network node/element, and even to be switched in that network node. Another source of the problem may be a huge number of services which should be allocated for the users on a rather limited number of wavelengths. Along with the dramatic increase nowadays of optical traffic being conveyed in optical networks, the problem becomes critical, especially in mesh optical networks where such conflicts are created almost at every node.

There are known methods for multimode optical transmissions, where one and the same optical fiber is adapted to transmit optical signals at two or more different modes, although mode crosstalk between the signals may occur.

For example, some approaches for the multi-mode transmission are described in the following article: R. Ryf et al., "Space-division multiplexing over 10 km of three-mode fiber using coherent 6×6 MIMO processing" (OSA/OFC/NFOEC 2011).

Another approach is described in the article M. Salsi et al. "Transmission at 2×100 Gb/s, over Two Modes of 40 km-long Prototype Few-Mode Fiber, using LCOS-based Mode Multiplexer and Demultiplexer (PDPB9.pdf, OSA/OFC/NFOEC 2011).

G. Stepnyak et al. discloses ways of "Increasing Multimode Fiber Transmission Capacity by Multimode Selective Spatial Light Phase Modulation" ECOC 2010, Paper P6.3 (2010).

Clemens Koebele et al. demonstrate a multi mode division multiplexing system and discuss how data can be transmitted at different modes over a WDM channel, and how the data is affected by cross-talk in a paper "40 km Transmission of Five Mode Division Multiplexed Data Streams at 100 Gb/s at Low MIMO-DSP Complexity" (ECOC Postdeadline Papers© 2011 OSA).

There are also prior art examples, describing multimode optical fiber switching devices.

One example is US 2010/0040325 which describes an all-optical cross connect switch utilizing two-axis MEMS mirrors for cross connecting optical fibers in a first set of optical fibers to optical fibers in a second set of optical fibers. The optical fibers in the first and second sets are precisely positioned in a first fiber-micro lens positioning array to define a first set of parallel collimated cross-connect communication beam paths, wherein each path connects an optical fiber in the first set of optical fibers with a MEMS mirror in a first MEMS mirror array.

Still there is a need to practically and efficiently resolve the problem of switching optical signals being transmitted in various modes via an optical fiber network.

SUMMARY OF THE INVENTION

It is therefore one object of the present invention to provide a method and a device—an optical switching module—for modern optical communication networks, which allows switching of optical signals transmitted in different modes within a switching module, by using multimode and single mode optical wave guides and ports.

Another object of the invention is to resolve wavelength conflicts when switching optical channels in an optical communication network.

Still another object of the invention is to allow managing/controlling the switching of optical signals transmitted in different modes within a switching module, while taking into consideration possible effects to which the switched signals might be subjected to.

It is yet another object of the invention is to enable managing mode converters units and by determining which mode from among a plurality of available transmission modes available, to be used for specific optical signals.

Other objects of the present invention will become apparent from the following description.

According to a first aspect of the invention, there is provided a method of controlled switching, within an optical switching module, of optical signals having different modes of propagation, wherein the module being provided with at least two multi-mode ports MMPs, and a plurality of single-mode ports SMPs, wherein the method comprises:
  inputting at least one multimode optical signal to an MMP of said MMPs,
  inputting at least one single mode optical signal to an SMP of said SMPs,
  performing mode processing of one or more of said single mode and multi mode optical signals within the switching module,
  controllably and selectively switching different optical signals inputted to different ports of the module, thereby allowing switching:
    a) between multi-mode ports
    b) between single mode ports and one or more multi mode ports,
wherein at least one of the output ports is configured to convey a combination of multi-mode optical signals.

A single mode optical signal should be understood as an optical signal having a specific propagation mode. Usually, a single mode optical signal is transmitted via a single mode optical fiber SMF. A multi mode optical signal should be understood as a plurality of optical signals having different propagation modes; usually, such signals are simultaneously carried via a multimode optical fiber MMF (sometimes called a Few Mode Fiber FMF in the prior art).

The term "switching between ports" should be understood as conveying any optical signal (a single mode optical signal or a multi mode optical signal) between suitable input port(s) and output port(s) of the module.

According to another embodiment, the step of controllably and selectively switching different optical signals, is carried out based on feedback information received from a device operative downstream of the optical switching module, and wherein the information received relates to the quality of the multi-mode optical signals being conveyed via the at least one output port configured to convey multi-mode optical signals.

By yet another embodiment, the step of controllably and selectively switching different optical signals, comprises modifying at least one of the transmission modes from among the multi modes of transmission available, for conveying at least one of the optical signals via the at least one output port configured to convey multi-mode optical signals.

According to still another embodiment, the method comprises:

inputting two or more optical signals transmitted at two or more respective different propagation modes via at least one of said multi-mode ports MMPs, wherein said two or more optical signals being carried by one and the same optical wavelength/channel, thereby allowing independent switching, in said switching module, of the two or more different optical signals carried by one and the same optical wavelength but having different propagation modes.

The mode processing should be understood as comprising an operation of mode multiplexing/demultiplexing and optionally comprising an operation of mode conversion.

The method (actually, the mode processing step) preferably comprises at least one of the following operations:

mode multiplexing of single mode optical signals obtained either at two or more said SM ports, or after performing the switching step within the module;

mode demultiplexing of at least one multi mode optical signal obtained either from a MMP or after performing the switching step within the module.

The step of mode multiplexing may be preceded by the step of mode conversion of at least one of the single mode optical signals to be further mode multiplexed. Similarly, the step of mode de-multiplexing may be followed by a step of mode conversion of at least one of the single mode optical signals obtained after the mode de-multiplexing.

According to a second aspect of the invention, there is provided a MultiMode Optical Switching Module MMOSM (e.g. an integrated module), provided with at least two multi-mode ports MMPs, each being connectable to a multi-mode optical fiber (MMF), and a plurality of single-mode ports (SMPs), each being connectable to a single mode optical fiber (SMF);

the module (MMOSM) comprising
    a Bidirectional Optical Mode Processor (BOMP) interconnected with to at least one of the MMPs and at least one of the SMPs, and further interconnected, in order to exchange multi-mode optical signals and single mode optical signals, with
    a controllable optical switching device, "CSD", (being a switching fabric, or an optical cross connect OXC, or the like) capable of controllably and selectively switching any multi-mode optical signals and single-mode optical signals inputted to said device (say, obtained from MMPs, SMPs the module and/or from said BOMP);
    the MMOSM thereby allowing any type of switching between all said ports of the module:
        between different SMPs
        between different MMPs
        between SMPs and MMPs.

The multimode optical switching module MMOSM may form at least a part of a network node configured to operate in an optical network.

The bidirectional optical mode processor BOMP of the present invention, may comprise at least one Mode multiplexer MMUX and at least one Mode demultiplexer MDMUX.

According to another embodiment, the controllable optical switching device, CSD, is adapted to receive feedback information from a different device operative downstream of the optical switching module, said information received relates to the quality of the multi-mode optical signals being conveyed via the at least one output port configured to convey multi-mode optical signals, and wherein said controllable optical switching device is adapted to controllably and selectively switch multi-mode optical signals in response to the information received.

By yet another embodiment, the controllable optical switching device, CSD, is adapted to modify at least one of the transmission modes from among the multi modes of transmission available in response to the feedback information received, for conveying at least one of the optical signals in the modified transmission mode via the at least one output port configured to convey multi-mode optical signals.

Preferably, the BOMP also comprises one or more mode convertors for changing/converting propagation mode of the optical signals.

Further preferably, the mentioned MMUX may be associated with, or may incorporate there-inside at least one such a mode convertor for changing the propagation mode of a specific single mode optical signal before multiplexing it with other single mode optical signals. Similarly, the MDMUX may comprise one or more such mode convertors for changing the propagation mode of one or more of single mode optical signals at the output of the MDMUX.

The connections between the BOMP and the controlled switching device may be of various types. For example, the connections may comprise intermediate optical fibers being MMFs and SMFs, but may be formed without the fibers, just by direct coupling of the BOMP and the CSD, or by providing waveguides in an optical medium being not an optical fiber.

The BOMP may be composed of two sections (a first and a second), wherein the first section serving one direction of transmission (say, from input ports towards the controlled switching device CSD) and the second section serving the opposite direction of transmission (say, from the CSD to output ports).

Theoretically, the BOMP may be integrally bidirectional (i.e. all ports associated with it may be bidirectional Input/Output ports), including the Multi-Mode Ports MMPs. (It is understood that the Single Mode Ports SMPs are usually bidirectional.

In one exemplary embodiment, at least one multi mode port MMP may serve as a bidirectional port; for example at a moment of time T1 that specific port may serve traffic in one direction, while at a moment of time T2 the same port may serve traffic in the opposite direction.

Upon inputting a multimode optical signal into the discussed module (MOSM), that signal may be further a) demultiplexed in BOMP into single mode optical signals and then switched in the controlled switching device CSD; b) switched as is in the CSD;

For outputting another multimode signal from the module, that another signal might be a) obtained from the CSD as is, or b) was obtained in the BOMP by mode multiplexing of a number of single mode output signals which were received from the CSD and/or received at another SMP of the module.

Optical amplifiers may be provided in the MMOSM, and placed for example between the BOMP and CSD, to amplify the signals exchanged there-between. Alternatively or in addition, optical amplifiers may be provided at inputs and outputs of the MMUXes and MDMUXes.

In the proposed novel multimode optical switching module MMOSM, preferably:

the controlled optical switching device CSD comprises a control unit CU, said CSD being capable of conveying there-inside single mode and multimode optical signals, and being configurable under either local control or under supervision of a network management entity;

said BOMP being interconnected with the controlled optical switching device CSD via one or more internal multimode optical fibers MMFs or waveguides, and via a number of internal single mode optical fibers SMFs or waveguides;

the module (MMOSM) being thereby capable of selectively switching different optical signals carried via external multi-mode and single mode optical fibers (whenever connected to different ports of the module), so as to allow any type of switching as mentioned above.

Preferably, the MMOSM is provided with one or more optical amplifiers, for example associated with its ports, and/or with inputs/outputs of MMUXes and MDMUXes and/or with internal connections between the BOMP and the CSD.

Preferably, the proposed switching module MMOSM is adapted for switching a multi-mode optical signal carried at one wavelength in the following manner:

a) to bring optical signals, carried at one and the same optical wavelength but at different modes, from a multimode input port either to a multi-mode output port or to different single-mode output ports, and b) to bring optical signals, carried at one and the same optical wavelength but at different modes, received from single-mode input ports, either to a common multi-mode output port, or to different single-mode output ports.

The proposed switching module thereby allows utilizing the same wavelength for different optical signals in the network, and allows switching such signals in the MMOSM.

In one example, in the proposed module MMOSM, at least one port of said MMPs may be connected both to the BOMP (say, to its MDMUX) and directly to said controlled optical switching device CSD, and at least one port of said SMPs may be connected both to said BOMP (and there-inside to its MMUX) and directly (or via a mode converter and possibly via an optical amplifier) to said CSD. In such a way, many additional options of switching can be created.

The proposed MMOSM as a whole, and particularly, its CSD is reconfigurable.

BRIEF DESCRIPTION OF THE DRAWINGS

The invention will be further described and illustrated with the aid of the following non-limiting drawings, in which.

DETAILED DESCRIPTION

Figure 1A:
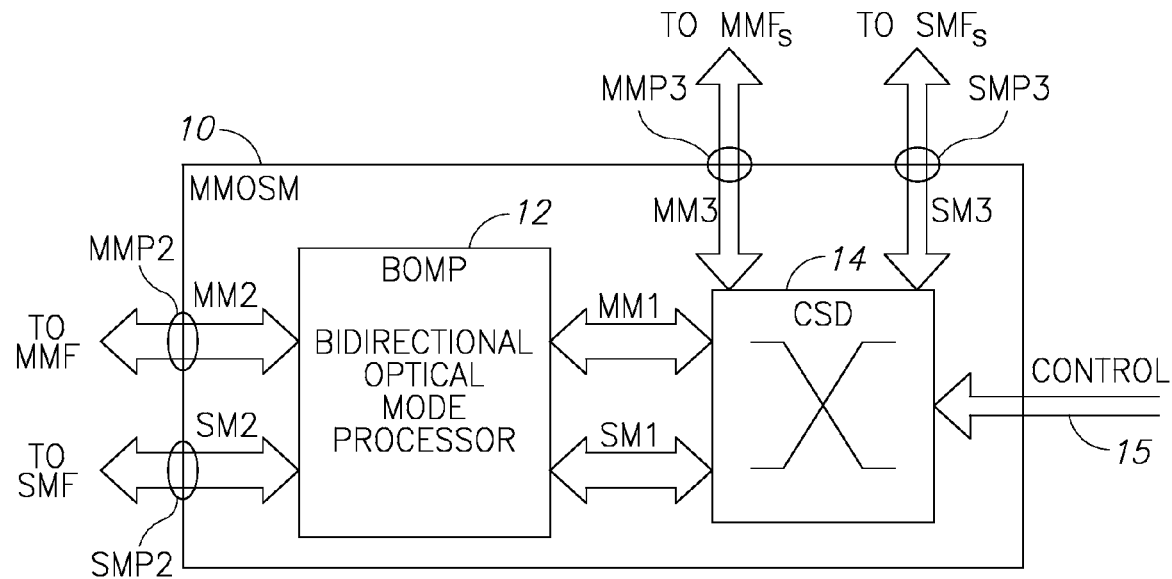
FIG. 1A schematically illustrates a general concept of the proposed multimode optical switching module (MMOSM).

FIG. 1A shows a schematic block diagram of the proposed multimode optical switching module MMOSM 10, which is an integral product in this example. Module 10 may form at least a part of a network node.

The module 10 is provided with single mode and multi mode input and output ports MMP2, MMP3, SMP2, SMP3 and comprises two main blocks:

1. A bidirectional optical mode processor BOMP 12 which is adapted to mode-multiplex a number of single mode optical signals into multi mode optical signal(s), and vice versa—to mode-demultiplex multi-mode optical signals into more single mode optical signals—according to the pre-configured solution. The BOMP may optionally convert propagation modes of optical signals (will be shown in other drawings). The signals to be MMUXed or MDMUXed may be of the same wavelength.

2. A controllable switching device CSD (a switching fabric, an optical cross connect (OXC), an optical switch (OSW)) 14 adapted to switch there-inside single mode and multi-mode optical signals. The CSD is controlled and configurable (see arrow 15).

According to the general universal concept, blocks 12 and 14 are in bidirectional communication with one another. The bidirectional communication between 12 and 14 is performed by transferring there-between multi-mode optical signals marked MM1 and single mode optical signals SM1.

Each of the blocks 12, 14 is in the bidirectional communication with ports of the module 10.

Block 12 (BOMP) communicates with a group of multi-mode ports MMP2 of the module by means of multi mode optical signals MM2. A group of single mode ports SMP2 serves for exchanging, with block 12, single mode signals SM2.

Block 14 (a controlled switching device CSD) uses multi mode ports MMP3 of the module for inputting and outputting multimode optical signals MM3. Block 14 uses single mode ports SMP3 for inputting and outputting single mode signals SM3.

FIG. 1A implicitly supposes that either ports of the module are bidirectional I/O ports, or that at least some groups of ports (say, MMP2, MMP3) comprise both input and output unidirectional ports.

Figure 1B:
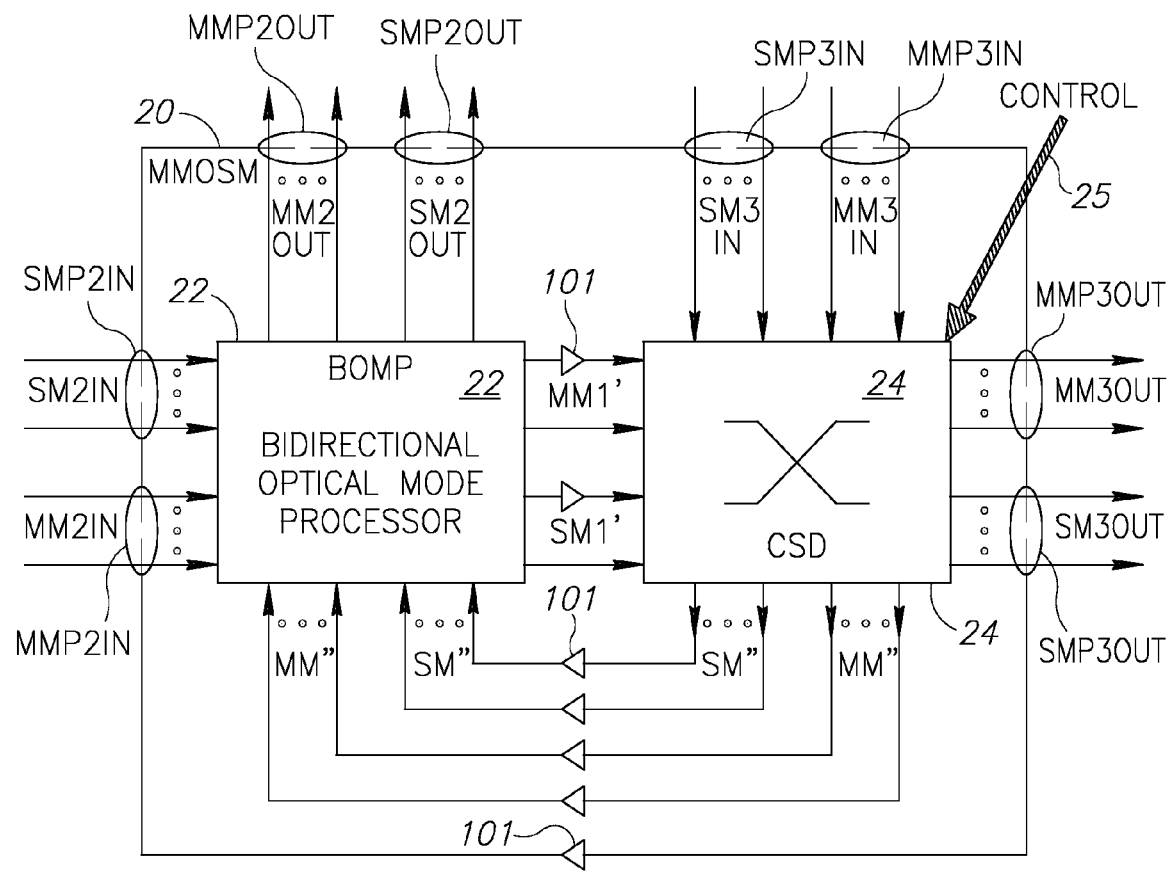
FIG. 1B schematically illustrates another version of the general concept of the proposed module.

FIG. 1B shows how each group of ports of FIG. 1A may be presented as a sub-group of unidirectional input ports and a sub-group of unidirectional output ports.

The optical signals (both the multi mode and the single mode ones) can also be schematically divided into incoming and outgoing.

For example, the multi-mode and multi-port switching module MMOSM 20 comprises a bidirectional optical mode processor BOMP 22 and a controlled switching device CSD 24. Multi-mode optical signals are inputted into the module 20 as signals MM2 IN via multimode input ports MMP2IN, and as signals MM3IN via multimode input ports MMP3IN. Switched in the module 20 multi-mode optical signals are outputted from the module 20 as signals MM2OUT via multi-mode output ports MMP2OUT, and as signals MM3OUT via multi-mode output ports MMP3OUT. The signals switched in the MMOSM should be understood as those which most probably have undergone mode multiplexing/demultiplexing, and often—mode conversion and rearrangement. For example, the outgoing multi-mode signals may comprise other combinations of single-mode component signals than those in the incoming multi-mode signals.

A similar arrangement may exist for single-mode optical signals, and it is shown in FIG. 1B wherein single mode incoming signals are inputted via single mode input ports SMP2IN, SMP3IN and the switched/processed single mode signals are outputted via output ports SMP2OUT, SMP3OUT.

Multi-mode and single-mode optical signals which are being exchanged between the BOMP 22 and the CSD 24 are marked as MM1', SM1' (from 22 to 24) and MM1", SM1" (from 24 to 22). These signals may pass between blocks 22 and 24 through internal optical fibers, but may use internal waveguides provided in the module MMOSM 20.

Some examples of specific structure of the bidirectional optical mode processor BOMP and the whole proposed switching module MMOSM will be presented in the following figures.

Connection lines MM', MM", SN', SM", may be provided with optical amplifiers to compensate attenuation of the signals which may occur in the BOMP. In addition, each input and output port of the MMOSM may be equipped with suitable optical amplifiers.

Figure 2:
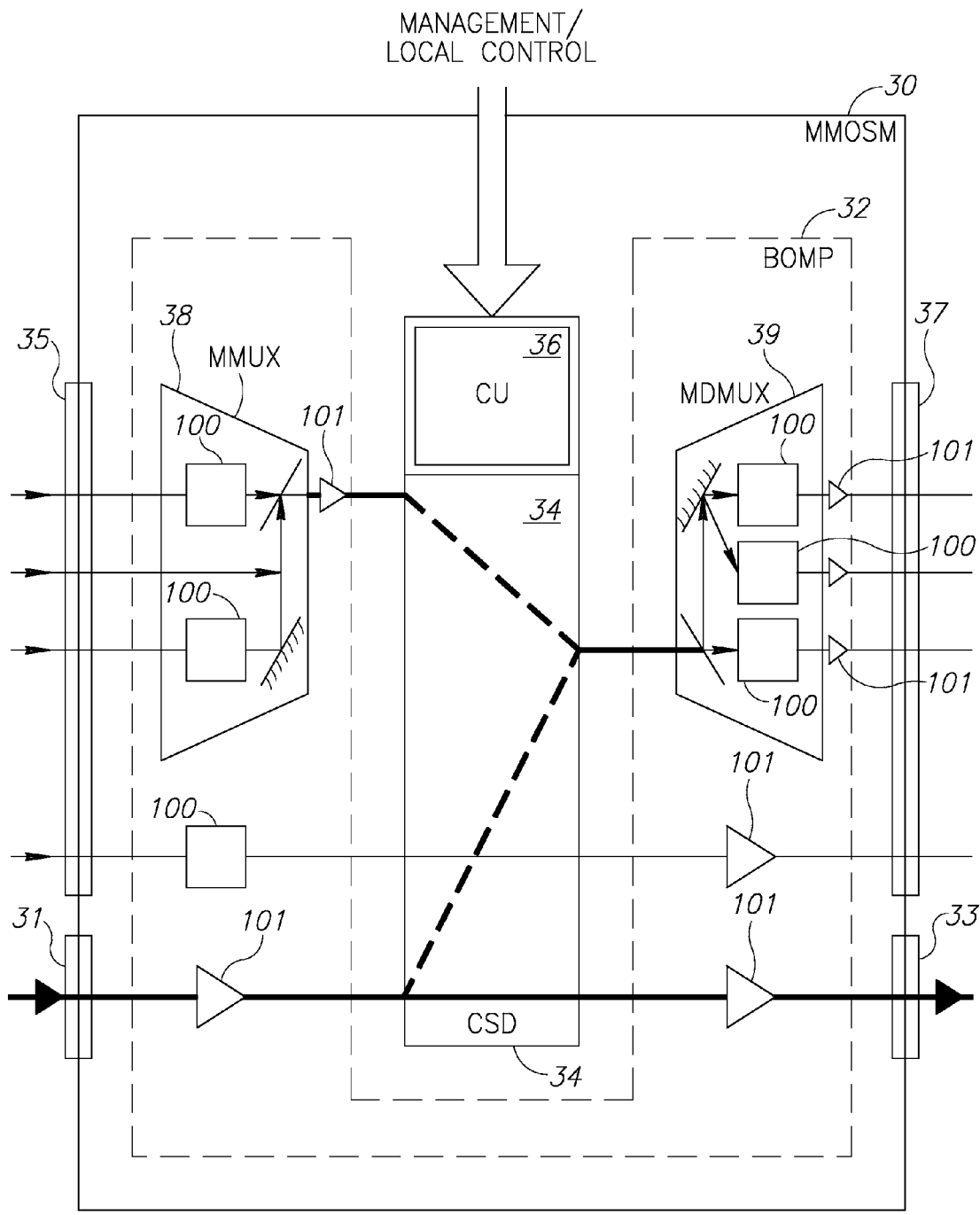
FIG. 2 schematically illustrates one embodiment of the proposed integral multi mode optical switching module MMOSM.

FIG. 2 illustrates one exemplary embodiment of the proposed switching multimode and multiport optical switching module MMOSM 30. It comprises a bidirectional optical mode processor BOMP 32 schematically shown as divided into an input, left-hand portion and an output, right-hand portion. A controlled switching device CSD 34 (a switching fabric, an optical cross-connect OXC, an optical switch OSW) having its Control Unit 36 is located between the input portion and the output portion of the BOMP 32. The control unit is controllable by a Network Management entity such as NMS or the like, or by any local control (for example, by an operator capable to introduce commands to configure the CSD device 34).

The MMOSM module 30 is provided with two or more multimode ports: an input port 31 and an output port 33 are shown; further, module 30 has a plurality of single-mode ports: a group of input ports 35 and a group of output ports 37 are shown. In this example, a single mode port 31 is provided with its individual mode converter 100.

The BOMP 32, in this example, comprises:
M single mode to multimode multiplexers 38 (One Mode multiplexer MMUX is shown). The MMUX 38 has three input ports connected by single mode fibers (or directly) to single mode ports 35, and one output port connected via a multimode fiber or directly to the controlled switching device CSD 34. In the MMUX 38, two optical converters 100 are shown which change mode of two incoming single mode signals. The third one remains at its mode. The three signals are then coupled to be combined into a multimode signal, amplified and inputted into the CSD 34. For pictorial illustration, single mode signals/fibers are shown as thin lines, while multimode ones are illustrated using thick lines.

N multimode to single mode demultiplexers 39 (One Mode demultiplexer MDMUX 39 is shown). In this example, MDMUX 39 has one input port connected via a multimode fiber (or directly) to the switching device CSD 34 and three output ports connected via single mode fibers or directly to single mode ports 37.

The MMUXes and MDMUXes comprise mode converters (all such converters are marked 100) for one or more single mode optical signals.

MDMUX 39 comprises three converters 100 which convert modes of the split multimode signal.

The internal structure of the MMUXes and MDMUXes (38, 39) is schematically shown similar to the structure mentioned in the articles referred to in the Background section of the description (G. Stepnyak et al., M. Salsi et al, Koebele at al.). However, this structure may be not identical to any of them and indeed differs in the presented FIG. 2.

The controlled optical switching device CSD 34 (fabric, switch, OXC) may comprise, for example, a configurable plurality of multimode and single mode fibers or internal waveguides for carrying single mode and multi-mode optical signals. In this example, the switching fabric 34 comprises a control unit CU 36 for local configuring of the fabric, or the CU may be managed from the network management entity.

In a practical example, two or more optical signals having the same wavelength can be inputted to a first Mode multiplexer of the converter 32, via respective single-mode optical fibers connected to ports 35. For the obtained multi-mode optical signal fed to the CSD 34, a suitable tunnel/path/waveguide should be configured in the CSD.

For configurable switching of such a multimode signal, one or more suitable tunnels should be ready in the CSD. After switching, the multimode signal may be directly outputted via a multimode output port (for example, port 33). Alternatively, it can be separated into at least two single-mode signals by a Mode DMUX 39, which are then outputted via SM ports, for example some of the group 37.

In a simple case, one multi-mode input port (say, 31) may be connected to a second multi-mode output port 33 of the switching module; the CSD 34 may be configurable also for that option. Similar possibilities may of course exist also for single mode optical signals. These options are shown in FIG. 1A as arrows MM3 and SM3, and in FIG. 2 as a separate connection between a group of ports 35 and a group of ports 37, passing via an individual ("stand-alone in the module") mode converter 100.

The switching of signals carried by at least one multimode fiber (MMF) allows independent and non-disturbing switching, in said switch, of two or more to different optical signals carried by one and the same optical wavelength.

The MMOSM may be provided with a number of optical amplifiers, shown schematically and marked 101.

Figure 3:
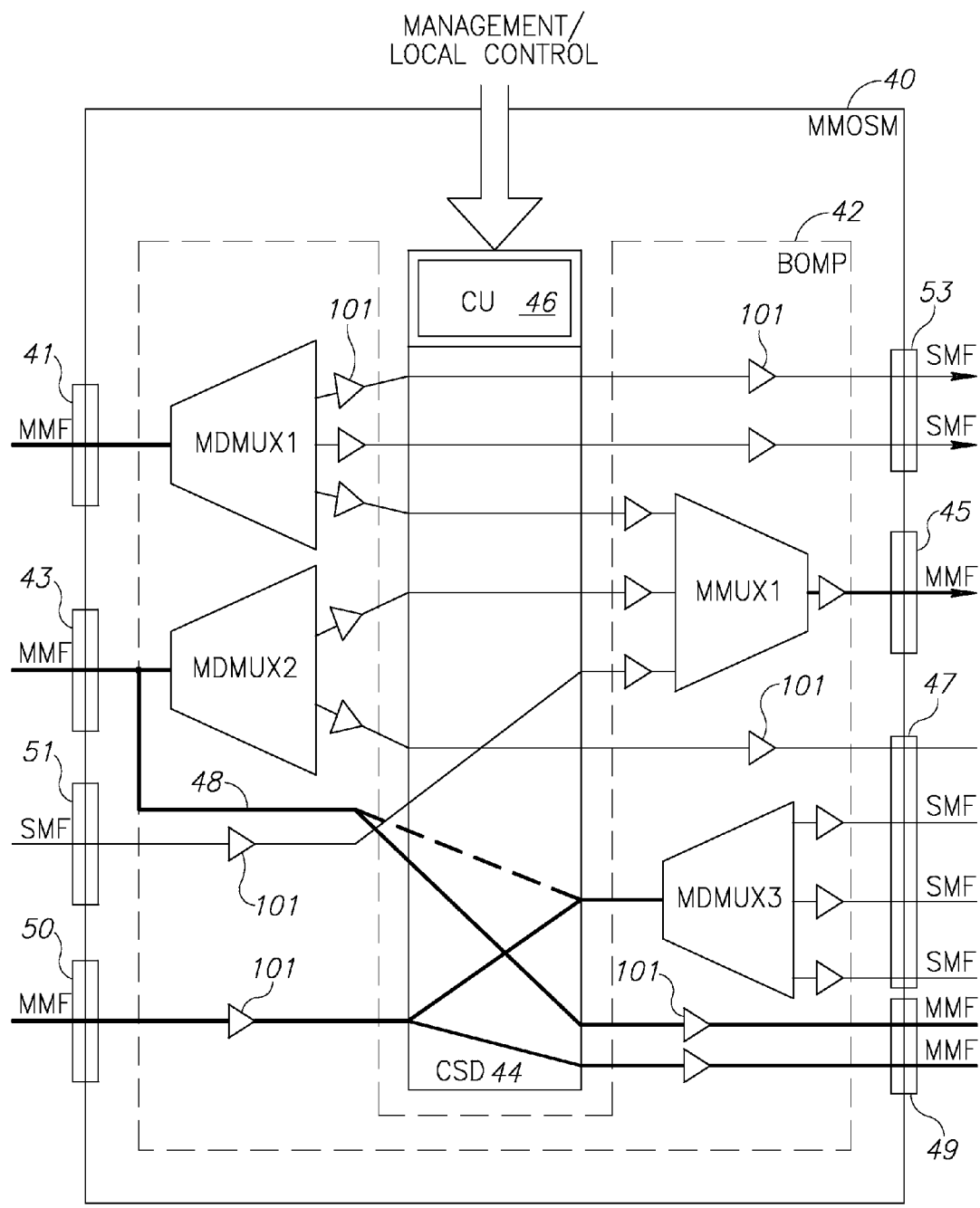
FIG. 3 schematically shows another embodiment of the integral MMOSM.

FIG. 3 shows how the proposed switching module MMOSM may be arranged in a slightly different way.

The MOSM 40 is provided with a plurality of ports comprising multimode optical ports (41, 43, 49, 50) and a plurality of single-mode optical ports (47, 51, 53). Multimode ports MMPs are connectable to multimode fibers MMFs (MMFs and optical paths/waveguides of multimode optical signals are shown as thick lines). Single mode ports SMPs are connectable to single mode fibers SMFs (SMFs and singe mode optical paths/waveguides are shown as thin lines).

The module 40 comprises a CSD 44 (a controlled optical switching matrix, OXC, OSW) adapted to controllably form tunnels there-inside between its own different ports. Control unit CU 46 of the CSD 44 can be controlled from the network or locally.

According to a preferred embodiment of the invention, the controllable optical switching device, CSD 44, is further adapted to receive feedback information from a different device, operating downstream of the optical switching module, wherein the information received relates to the quality of the multi-mode optical signals being conveyed via the at least one output port configured to convey multi-mode optical signals, and wherein the controllable optical switching device is adapted to controllably and selectively switch multi-mode optical signals in response to the information received. For example, in case the information received indicates that a former switching of a certain multimode optical signals, have been received at their destination at a too low quality, the controllable optical switching device is operative to change (e.g. re-select) which optical signals will be carried along that at least one output port, and the mode they will be conveyed at.

Furthermore, the controllable optical switching device, CSD, may be adapted to modify at least one of the transmission modes from among the multi modes of transmission available in response to the feedback information received. Let us assume that the signal is received at a degraded quality at a feedback providing device located downstream of optical module 40. Once the controller receives this feedback it will determine whether to affect a change in one or more of the transmission mode of the one or more of the optical signals which are conveyed together (each at a different mode) for example if it establishes that the degradation was caused due to an unsuccessful selection of the transmission mode that was conveyed to the device located downstream of optical module 40. By affecting such a change, a better mode may be used to reduce the mutual interference between the different optical signals, each being conveyed at a different mode via the at least one multi-mode output port.

The module 40 comprises a bidirectional mode processor BOMP 42, being in communication with various ports of the module 40 and with the controlled switching device 44 (CSD).

In this version, the input, left hand portion of the BOMP 42 comprises two multi-mode to single mode demultiplexers (MDMUX1 and MDMUX2). Each of them has an input port coupled to a multimode input port (41 or 43); three/two output ports of MDMUXes are respectively coupled, via single mode fibers SMF, to the controlled switching device 44.

At the output, right hand portion of the BOMP 42, there is a single mode to multimode multiplexer MMUX1, receiving at its three inputs three single mode optical signals from the CSD 44, and outputting a multi-mode optical signal via its output coupled to a multimode output port 45 at the output side of the module. The port 45 is connected to a multi-mode fiber MMF.

The BOMP 42 further comprises (at its output portion) an MDMUX3 obtaining a multi-mode optical signal from the CSD 44 and producing three single mode signals which are outputted from the module 40 via a group 47 of single mode ports.

It should be noticed that a multi-mode port (say, port 43) connected to a specific MDMUX (MDMUX 2), may be also directly connected to the controlled switching device CSD (see waveguide 48). Such an option is shown in FIG. 1 as an arrow MM3. The purpose of such a connection may be, for example, for broadcasting a particular signal from a specific source to a number of destinations.

The MMOSM 40 preferably comprises mode convertors (not shown, provided in the MMUXes and MDMUXes) and a plurality of optical amplifiers 101.

It should be appreciated that other embodiments of the proposed multimode optical switching module, and suitable versions of switching within the module may be proposed, and should be considered part of the present invention whenever defined by the claims which follow.

The invention claimed is:

1. A method of controlled switching, within an optical switching module, of optical signals having different modes of propagation, wherein the module being provided with at least two multi-mode ports MMPs and a plurality of single-mode ports SMPs;
the method comprises
inputting at least one multimode optical signal to an MMP of said MMPs,
inputting at least one single mode optical signal to an SMP of said SMPs,
performing mode processing of one or more of said single mode and multi mode optical signals within the switching module,
controllably and selectively switching different optical signals inputted to different ports of the module, thereby allowing any type of switching:
between single mode ports
between multi-mode ports
between single mode and multi mode ports.

2. The method of claim 1, wherein the step of controllably and selectively switching different optical signals, is carried out based on feedback information received from a device operative downstream of said optical switching module, and wherein the information received relates to the quality of the multi-mode optical signals being conveyed via at least one output port configured to convey multi-mode optical signals.

3. The method of claim 2, wherein the step of controllably and selectively switching different optical signals, comprises modifying at least one of the transmission modes from among the multi modes of transmission available, for conveying at least one of the optical signals via the at least one output port configured to convey multi-mode optical signals.

4. The method according to claim 1, comprising:
inputting two or more optical signals transmitted at two or more respective different propagation modes via at least one of said multi-mode ports MMPs, wherein said two or more optical signals being carried by one and the same optical channel, thereby allowing independent switching, in said switching module, of the two or more different optical signals carried by one and the same optical channel but having different propagation modes.

5. The method according to claim 1, wherein the mode processing comprises at least one operation of the following: mode multiplexing and mode demultiplexing.

6. The method according to claim 5, wherein the mode processing also comprises an operation of mode conversion.

7. The method according to claim 6, wherein said mode multiplexing is preceded by the operation of mode conversion of at least one of the single mode optical signals to be further mode multiplexed, and wherein said mode de-multiplexing is followed by the operation of mode conversion of at least one of the single mode optical signals obtained after the mode de-multiplexing.

8. A multimode optical switching module MMOSM, provided with at least two multi-mode ports MMPs, each being connectable to a multi-mode optical fiber MMF, and a plurality of single-mode ports SMPs, each being connectable to a single mode optical fiber SMF;
the MMOSM comprising
a bidirectional optical mode processor BOMP interconnected with at least one of the MMPs and at least one of the SMPs, and further interconnected, in order to exchange multi-mode optical signals and single mode optical signals, with
a controllable optical switching device CSD capable of controllably and selectively switching any multi-mode optical signals and single-mode optical signals in said device;
the MMOSM thereby allowing any type of switching between all said ports of the module:
between different SMPs
between different MMPs
between SMPs and MMPs.

9. The MMOSM according to claim 8, wherein the controllable optical switching device is adapted to receive feedback information from a different device operating downstream of the optical switching module, said information relates to the quality of the multi-mode optical signals being conveyed via at least one output port configured to convey multi-mode optical signals, and wherein said controllable optical switching device is adapted to controllably and selectively switch multi-mode optical signals in response to the information received.

10. The MMOSM according to claim 9, wherein the controllable optical switching device is adapted to modify at least one of the transmission modes from among the multi modes of transmission available in response to the feedback information received, for conveying at least one of the optical signals in the modified transmission mode via the at least one output port configured to convey multi-mode optical signals.

11. The MMOSM according to claim 9, wherein the bidirectional optical mode processor BOMP comprises at least one Mode multiplexer MMUX and at least one Mode demultiplexer MDMUX.

12. The MMOSM according to claim 11, wherein the BOMP further comprises one or more mode convertors for changing propagation mode of the optical signals, and wherein said at least one of said MMUX is associated with at least one mode convertor.

13. The MMOSM according to claim 12, wherein at least one multi mode port MMP serves as a bidirectional port.

14. The MMOSM according to claim 12, provided with one or more internal optical amplifiers.

15. The MMOSM according to claim 12,
adapted for switching a multi-mode optical signal carried at one wavelength in the following manner:
a) to bring optical signals, carried at one and the same optical wavelength but at different modes, from a multimode input port either to a multi-mode output port or to different single-mode output ports, and
b) to bring optical signals, carried at one and the same optical wavelength but at different modes, received from single-mode input ports, either to a common multi-mode output port, or to different single-mode output ports;
the MMOSM thereby allows utilizing the same wavelength for different optical signals in the network, and switching thereof.

16. The MMOSM according to claim 12 wherein
at least one port of said MMPs is connected both to the BOMP and directly to said controlled optical switching device CSD, and
at least one port of said SMPs is connected both to said BOMP and to said CSD.

17. The MMOSM according to claim 11, wherein the BOMP is composed of two sections, the first section serving one direction of transmission and the second section serving the opposite direction of transmission.

18. The MMOSM according to claim 8, wherein:
the controllable optical switching device CSD comprises a control unit CU, said CSD being capable of conveying there-inside single mode and multimode optical signals, and being configurable under either local control, or under supervision of a network management entity;
said BOMP being interconnected with the controlled optical switching device CSD via one or more internal multimode optical fibers MMFs or waveguides, and via a number of internal single mode optical fibers SMFs or waveguides;
the module (MMOSM) being thereby capable of selectively switching different optical signals.

* * * * *